United States Patent
Sawa (10) Patent No.: US 10,814,543 B2
(45) Date of Patent: Oct. 27, 2020

(54) TRANSMISSION GEAR SYSTEM OF MULTI-SCREW EXTRUDER OR KNEADER

(71) Applicant: Kohei Sawa, Osaka (JP)

(72) Inventor: Kohei Sawa, Osaka (JP)

(*) Notice: Subject to any disclaimer, the term of this patent is extended or adjusted under 35 U.S.C. 154(b) by 365 days.

(21) Appl. No.: 15/565,993

(22) PCT Filed: Apr. 14, 2016

(86) PCT No.: PCT/JP2016/062035
§ 371 (c)(1),
(2) Date: Oct. 12, 2017

(87) PCT Pub. No.: WO2016/167326
PCT Pub. Date: Oct. 20, 2016

(65) Prior Publication Data
US 2018/0111305 A1    Apr. 26, 2018

(30) Foreign Application Priority Data
Apr. 15, 2015    (JP) .................................. 2015-083339

(51) Int. Cl.
*B29C 48/25* (2019.01)
*B29C 48/40* (2019.01)
(Continued)

(52) U.S. Cl.
CPC ............ *B29C 48/2526* (2019.02); *B29B 7/46* (2013.01); *B29C 48/252* (2019.02);
(Continued)

(58) Field of Classification Search
CPC ............. B29C 48/2526; B29C 48/252; B29C 48/2522; B29C 48/40; F16H 1/20; B29B 7/46; Y10T 74/19084
See application file for complete search history.

(56) References Cited

U.S. PATENT DOCUMENTS 4,261,225 A * 4/1981 Zahradnik ............. B30B 11/241
                                                74/665 GA
4,679,461 A * 7/1987 Mizuguchi ............ B30B 11/241
                                                74/665 GA
(Continued)

FOREIGN PATENT DOCUMENTS

CN        201483736        5/2010
DE        25 59 135        7/1976
(Continued)

OTHER PUBLICATIONS

Notification of Transmittal of Copies of Translation of the International Preliminary Report on Patentability dated Oct. 26, 2017 in International Application No. PCT/JP2016/062035.
(Continued)

*Primary Examiner* — Jeremy R Severson
(74) *Attorney, Agent, or Firm* — Wenderoth, Lind & Ponack, L.L.P.

(57) ABSTRACT

It is possible to provide a transmission gear system of a multi-screw extruder or kneader, distributedly receiving loads applied on driven shafts without complicating the device configuration. The transmission gear system of a multi-screw extruder or kneader having a plurality of screw shafts, includes a driving shaft to which a driving gear is fixed, rotationally driven by a driving device; a driven shaft to which a driven gear engaged with the driving gear is fixed, the driven shaft being coupled to the screw shaft so as to allow the screw shaft to be rotationally driven and a load distribution shaft disposed in a region opposite to the driving shaft with respect to the driven shaft. A radial load generated on the driven shaft is transmitted via the driven gear and the load distribution gear to the load distribution shaft to distribute the load.

10 Claims, 9 Drawing Sheets

(51) Int. Cl.
    *B29B 7/46*   (2006.01)
    *F16H 1/20*   (2006.01)
(52) U.S. Cl.
    CPC .......... *B29C 48/2522* (2019.02); *B29C 48/40* (2019.02); *F16H 1/20* (2013.01)

(56) References Cited

U.S. PATENT DOCUMENTS

| | | | | |
|---|---|---|---|---|
| 5,511,874 | A | * | 4/1996 | Ikegami ................ B29C 48/252 |
| | | | | 366/100 |
| 6,318,202 | B1 | * | 11/2001 | Hahn ........................ F16H 1/22 |
| | | | | 74/424.7 |
| 2001/0008372 | A1 | * | 7/2001 | Yagi ...................... B29C 48/252 |
| | | | | 318/640 |
| 2011/0128812 | A1 | | 6/2011 | Eckart et al. |
| 2014/0060474 | A1 | | 3/2014 | Ohno et al. |

FOREIGN PATENT DOCUMENTS

| | | |
|---|---|---|
| EP | 0 995 580 | 4/2000 |
| JP | 55-027513 | 2/1980 |
| JP | 63-027230 | 2/1988 |
| JP | 6-39899 | 2/1994 |
| JP | 6-39900 | 2/1994 |
| JP | 9-248850 | 9/1997 |
| JP | 2001-191392 | 7/2001 |
| JP | 2008-307878 | 12/2008 |
| JP | 2010-76444 | 4/2010 |
| JP | 2014-47836 | 3/2014 |

OTHER PUBLICATIONS

Office Action and Search Report dated Aug. 6, 2019 in corresponding Russian Patent Application No. 2017138236, with English translation.
International Search Report dated May 17, 2016 in International (PCT) Application No. PCT/JP2016/062035.
Extended European Search Report dated Nov. 13, 2018 in corresponding European Patent Application No. 16780117.4.
Office Action dated Nov. 25, 2019 in corresponding Indian Patent Application No. 201747039803 with English-language translation.

* cited by examiner

TRANSMISSION GEAR SYSTEM OF MULTI-SCREW EXTRUDER OR KNEADER

TECHNICAL FIELD

The present invention relates to a transmission gear system of a multi-screw extruder or kneader rotationally driving a plurality of screw shafts by a single driving device.

BACKGROUND ART

Figure 10:
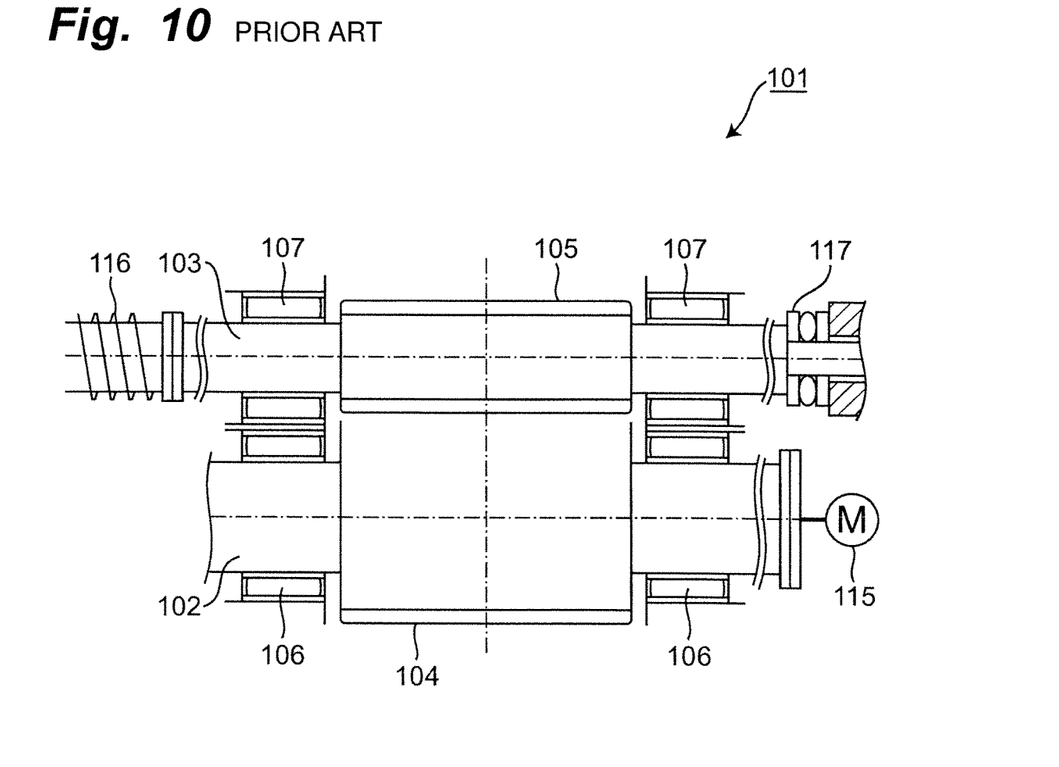
FIG. 10 is a configuration diagram of a conventional transmission gear system.
Figure 11:
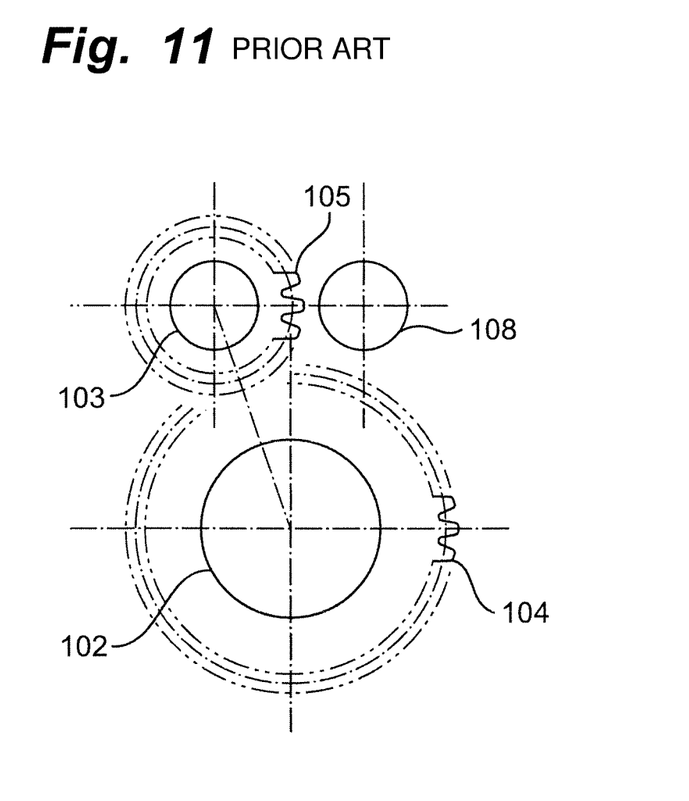
FIG. 11 is a cross-sectional view of the conventional transmission gear system of FIG. 10.

Such type of a transmission gear system of a multi-screw extruder has hitherto been known as having various structures. FIG. 10 partially shows a structure of such a conventional transmission gear system of a multi-screw extruder and FIG. 11 illustrates a sectional view of the transmission gear system of FIG. 10.

As shown in FIG. 10, an existing transmission gear system 101 includes: a driving shaft 102 connected to a driving motor 115 that is a rotational driving device; and a driven shaft 103 rotationally driven by a rotational driving force transmitted from the driving shaft 102. The driven shaft 103 is connected to a screw shaft 116 for example so that rotational driving of the driven shaft 103 causes rotational driving of the screw shaft 116, for resin extrusion processing, etc.

A driving gear 104 is formed on the driving shaft 102, while a driven gear 105 engaged with the driving gear 104 is formed on the driven shaft 103, whereupon the rotational driving force of the driving shaft 102 is transmitted via the driving gear 104 and the driven gear 105 to the driven gear 103.

The driving shaft 102 is rotatably supported by bearing parts 106 arranged in the vicinity before and after the driving gear 104, while the driven shaft 103 is rotatably supported by bearing parts 107 arranged in the vicinity before and after the driven gear 105. The driven gear 103 is rotatably supported by a thrust bearing 117 at a right-hand end of FIG. 10.

As shown in FIG. 11, a driven shaft (an interference shaft) 108 connected to another screw shaft is engaged via gears by the driving shaft 102 at a different position along the axial direction of the driving shaft 102 in a manner capable of being rotationally driven.

The thus configured existing transmission gear system 101 employs a configuration in which a load such as a resin back pressure generated on the screw shaft 116 is received radially by the bearing parts 107 arranged in the vicinity before and after the driven gear 105 of the driven shaft 103.

Patent Document

Patent Document 1: JP 6-39899 A

SUMMARY OF THE INVENTION

Problem to be Solved by the Invention

In the configuration where the load generated on the driven shaft 103 is received by the bearing parts 107 lying on both sides of the driven gear 105, however, an increased transmission load leads to an increased bearing capacity. If the tooth widths of the driving gear 104 and the driven gear 105 engaging with each other are enlarged for the purpose of increasing the transmission capacity, the distance between the bearing parts 107 lying on both sides of the driven gear 105 becomes longer in addition to an increase in the load received by the bearing parts 107, resulting in a further increase in the load applied in a complex manner. Particularly, in the transmission gear system of the multi-screw extruder having a plurality of driven shafts 103, the enlargement of the bearing parts 107 or the gear width becomes one of factors impeding miniaturization of the system configuration.

Furthermore, when the resin back pressure, etc. is applied to the screw shafts in the device such as the multi-screw extruder, the driven shafts 103 are subjected to a large thrust load. Such a thrust load acts as a buckling load to the shafts and such a buckling load cannot fully be received by only the bearing parts 107. Accordingly, the shaft diameter of the driven shafts 103 may be increased to enhance the strength, which however impedes miniaturization of the system configuration. Considering the prevention of interference between the driven shafts 103, it is difficult to increase the shaft diameter.

Proposed as a configuration for solving the above conventional problem is for example a so-called dual-drive mechanism in which one gear is driven by two gears so that a radial load is received in a distributed manner (see, e.g. Patent Document 1).

The dual-drive mechanism as in Patent Document 1 can distribute the radial load, but needs an increased number of gear meshing stages as well as torsion measures called torsion bar against the increased driving shaft length. It is further necessary to allow for the arrangement of the bearings receiving the thrust load, leading to an increase in the system length and to the complication of the structure. The increased number of gear meshing stages after torque separation results in an increase of the amount of play in the rotational direction, due to the cumulative backlash. Furthermore, the increase in the number of gear stages increases the number of parts making up the transmission gear system and needs high machining accuracies of parts, resulting in an increase of labors and costs required for the assembly. In the case where such a dual-drive mechanism is applied to the multi-screw extruder or kneader, the increased number of gear stages and parts necessitate an arrangement configuration avoiding interference between the screw shafts, leading to an increase in size of the device configuration.

In the driving device of the extruder or kneader, esp. in an intermeshing multi-screw extruder (kneader), it is required to rotate the plurality of shafts without mutual interference with plays reduced as much as possible in the rotational direction. Increasing the device configuration size or altering the screw profile to prevent interference between the shafts does not fit the primary objective of the extruder or kneader and changes the screw shape and meshing state which influences the performance to a great extent.

It is therefore an object of the present invention to solve the above problem and to provide a transmission gear system of a multi-screw extruder or kneader, rotationally driving a plurality of screw shafts by a single driving device, the transmission gear system being capable of distributedly receiving loads applied on driven shafts without complicating the device configuration.

Means for Solving Problem

In order to achieve the above object, the present invention is configured as follows.

The first aspect of the present invention provides a transmission gear system of a multi-screw extruder or kneader having a plurality of screw shafts, the system including: a driving shaft to which a driving gear is fixed, rotationally driven by a driving device; a driven shaft to which a driven gear engaged with the driving gear is fixed, the driven shaft being coupled to the screw shaft so as to allow the screw shaft to be rotationally driven; and a load distribution shaft to which a load distribution gear engaged with the driven gear is fixed, the load distribution shaft being disposed in a region opposite to the driving shaft with respect to the driven shaft, wherein a radial load generated on the driven shaft is transmitted via the driven gear and the load distribution gear to the load distribution shaft to distribute the load.

The second aspect of the present invention provides the transmission gear system of a multi-screw extruder or kneader having a plurality of screw shafts, the system including: a driving shaft to which a driving gear is fixed, rotationally driven by a driving device; a driven shaft to which a driven gear engaged with the driving gear is fixed, the driven shaft being coupled to the screw shaft so as to allow the screw shaft to be rotationally driven; and a load distribution shaft disposed in a region opposite to the driving shaft with respect to the driven shaft, wherein a load-receiving bearing is fixed to the load distribution shaft, an outer ring portion of the load-receiving bearing comes into contact with an outer periphery of the driven shaft so that a radial load generated on the driven shaft is transmitted via the bearing to the load distribution shaft to distribute the load.

The third aspect of the present invention provides the transmission gear system of a multi-screw extruder or kneader according to the second aspect, wherein one or more load-receiving bearings are fixed to the load distribution shaft so as to come into contact with both end portions of the driven gear on the driven shaft.

The fourth aspect of the present invention provides the transmission gear system of a multi-screw extruder or kneader according to any one of the first to third aspect, wherein a plurality of load distribution shafts are arranged in a region opposite to the driving shaft with respect to the driven shaft.

The fifth aspect of the present invention provides the transmission gear system of a multi-screw extruder or kneader according to the fourth aspect, wherein two load distribution shafts are arranged in a region opposite to the driving shaft with respect to the driven shaft, and the two load distribution shafts and the driving shaft are arranged at substantially equal intervals around the driven shaft.

The sixth aspect of the present invention provides the transmission gear system of a multi-screw extruder or kneader according to the first or second aspect, wherein the load distribution shaft is disposed confronting the driving shaft via the driven shaft.

The seventh aspect of the present invention provides the transmission gear system of a multi-screw extruder or kneader according to the third aspect, wherein outer ring portions of the load-receiving bearings are formed integrally with each other.

Effect of the Invention

According to the present invention, a transmission gear system of a multi-screw extruder or kneader having a plurality of screw shafts, in which a driven shafts is rotationally driven by a driving shaft with a driving gear and a driven gear being engaged with each other, employs a configuration including a load distribution shaft to which a load distribution gear engaged with the driven gear is fixed, the load distribution shaft being disposed in a region opposite to the driving shaft with respect to the driven shaft so that a radial load generated on the driven shaft is transmitted via the driven gear and the load distribution gear to the load distribution shaft to distribute the load.

According to another aspect, there is employed a configuration including a load distribution shaft to which a load distribution gear engaged with a driven gear is fixed, the load distribution shaft being disposed in a region opposite to a driving shaft with respect to a driven shaft so that a radial load generated on the driven shaft is transmitted via the driven gear and the load distribution gear to the load distribution shaft to distribute the load.

According to such configurations, the load applied on the driven shaft can be distributed to and received by the load distribution shaft without complicating the system configuration. It thus becomes possible to reduce the bearing capacity of the driven shaft and to increase the shaft diameter of the driven shaft or the screw shaft in the multi-screw configuration, thereby enabling the allowable torque and power to be increased in the transmission gear system of the multi-screw extruder or kneader.

EMBODIMENT(S) FOR CARRYING OUT THE INVENTION

Embodiments according to the present invention will now be described in detail with reference to the drawings.

First Embodiment

Figure 1:
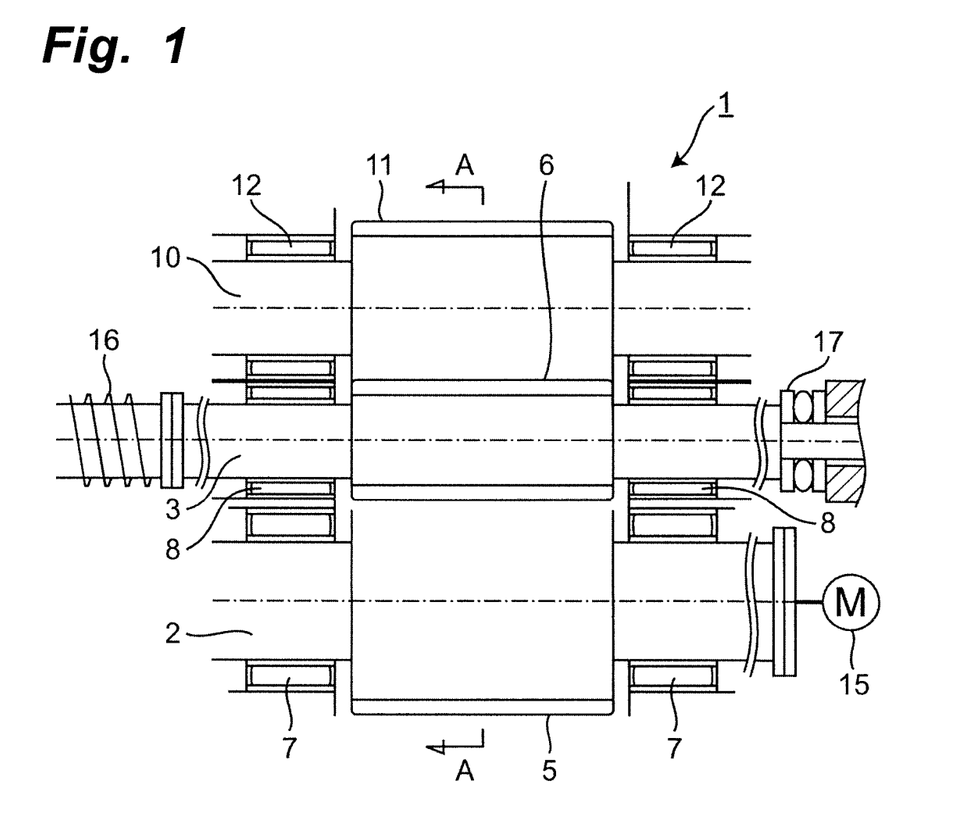
FIG. 1 is a configuration diagram of a transmission gear system according to a first embodiment of the present invention.
Figure 2:
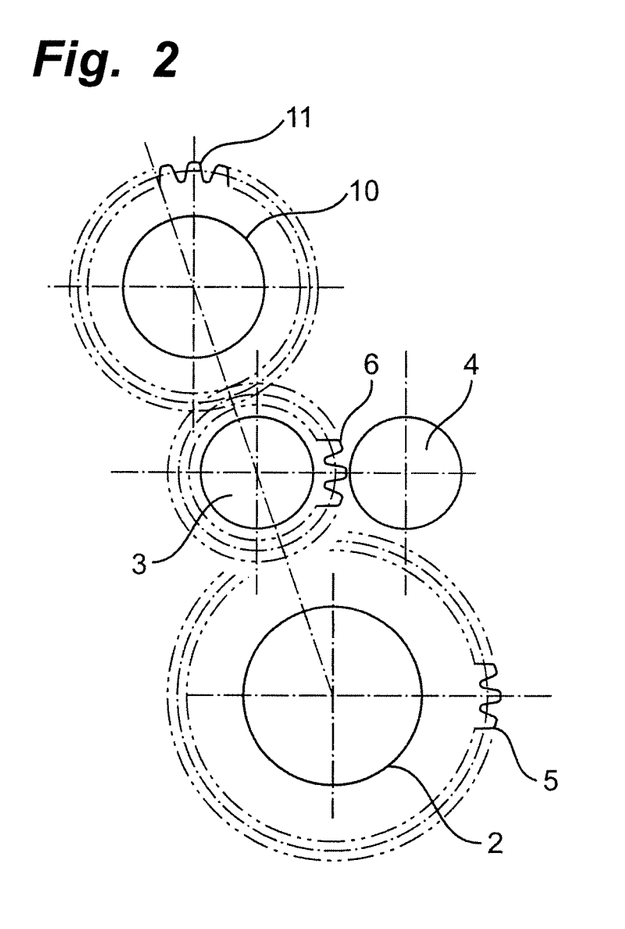
FIG. 2 is a cross-sectional view, taken along line A-A, of the transmission gear system of FIG. 1.

FIG. 1 shows a schematic configuration of a transmission gear system according to a first embodiment of the present invention. FIG. 2 is a cross-sectional view taken along line A-A of the transmission gear system shown in FIG. 1. This transmission gear system is for example a transmission gear system for use in a multi-screw extruder or kneader rotationally driving a plurality of screw shafts by a single driving device.

As shown in FIG. 1, a transmission gear system 1 of the first embodiment includes a driving shaft 2 connected to a driving motor 15 that is a rotational driving device; and a driven shaft 3 rotationally driven by a rotational driving force transmitted from the driving shaft 2. The driven shaft 3 is connected axially to a screw shaft 16 for example so that rotational driving of the driven shaft 3 causes rotational driving of the screw shaft 16, for resin extrusion processing, etc. As shown in FIG. 2, another driven shaft 4 is disposed next to the driven shaft 3 and is connected another screw shaft (not shown). The driven shaft 3 and the driven shaft 4 are arranged so as not to interfere with each other.

A driving gear 5 is formed on the driving shaft 2, while a driven gear 6 engaged with the driving gear 5 is formed on the driven shaft 3. Since the gears are engaged with each other in this manner, the rotational driving force of the driving shaft 2 is transmitted via the driving gear 5 and the driven gear 6 to the driven gear 3.

The driving shaft 2 is rotatably supported by bearing parts 7 arranged in the vicinity (axially) before and after the driving gear 5, while the driven shaft 3 is rotatably supported by bearing parts 8 arranged in the vicinity before and after the driven gear 6. The driven gear 3 is rotatably supported by a thrust bearing 17 at a right-hand end of FIG. 1.

Although the details are not shown, the driven shaft (interference shaft) 4 connected to the another screw shaft is engaged via gears by the driving shaft 2 at a different position along the axial direction of the driving shaft 102. The driving shaft 2 extends parallel to the two driven shafts 3 and 4, the shafts being arranged such that the respective distances from the rotation center of the driving shaft 2 to the rotation centers of the driven shafts 3 and 4, respectively, are equal to each other.

Furthermore, as shown in FIGS. 1 and 2, a load distribution shaft 10 engaged with the driven shaft 3 is disposed at a position (e.g. position confronting each other through 180 degrees) confronting the driving shaft 2 via the driven shaft 3. A load distribution gear 11 engaged with the driven gear 6 is fixed to the load distribution shaft 10 so that the load distribution shaft 10 is rotationally driven in synchronism with the rotational driving of the driven shaft 3. The load distribution shaft 10 is rotatably supported by bearing parts 12 arranged in the vicinity before and after the load distribution gear 11.

Although the details are not shown, another load distribution shaft is disposed for the another driven shaft 4, in the same manner as the relationship between the driven shaft 3 and the load distribution shaft 10.

According to such a configuration of the transmission gear system 1 of the first embodiment, a load such as the resin back pressure generated on the screw shaft 16 is transmitted radially from the driven shaft 3 via the driven gear 6 and the driving gear 5 to the driving shaft 2. At the same time, the load is also transmitted radially from the driven shaft 3 via the driven gear 6 and the load distribution gear 11 to the load distribution shaft 10. Accordingly, the radial load generated on the driven shaft 3 can be distributed to and shared by the load distribution shaft 10, unlike the case of receiving by only the bearing parts 8 and the driving shaft 2.

By virtue of employment of such a configuration where the radial load generated on the driven shaft 3 is distributed to and received by the load distribution shaft 10, the load distribution can be performed without complicating the system configuration. It becomes possible for example to reduce the capacity (bearing capacity) of the bearing parts 12 supporting the load distribution shaft 10. It also becomes possible, if the bearing capacity can be reduced, to relatively enlarge the diameter of the driven shafts or of the screw shafts in the multi-screw configuration. It thus becomes possible to increase the allowable torque and power in the transmission gear system 1 of the multi-screw extruder or kneader.

Since the load distribution shaft 10 is disposed to receive the radial load of the driven shaft 3, no constraint is imposed to the number of teeth of the load distribution gear 11. The shaft diameter of the load distribution shaft 10 need not be equal to the shaft diameters of the other shafts such as the driven shaft 3 or the driving shaft 2. The plurality of load distribution shafts need not necessarily have the same diameter. It is therefore possible to enhance the flexibility of design of the load distribution shaft 10 receiving the load in a distributed manner.

Since the load distribution gear 11 is not intended for driving, it does not need a backlash (play between tooth surfaces) as in normal gears (e.g. a gear intended for driving), or conversely, it may have a greater backlash. Hence, the drive train components are not required to have high machining accuracies as in the multi-stage configuration, enabling the drive train structure to be simplified.

By virtue of employment of the configuration where the load is distributed to and received by the load distribution shaft 10, even when a thrust load such as the resin back pressure generated on the screw shaft is applied as a buckling load to the driven shaft 3, the buckling load can be distributed to and received also by the load distribution shaft 10. It thus becomes possible to cope with a high-pressure specification in the multi-screw extruder or kneader. While the thrust load generated on the screw shaft is received by the thrust bearing 17, part of the thrust load acts as a buckling load between the axial end surfaces of the driven gear 6.

The configuration of the first embodiment need not increase the gear stages and alter the screw profile (screw shape, etc.) of the screw shaft. Hence, it also becomes possible to enhance the self-cleaning properties of the screw shafts.

Although the case has been described by way of example where the load distribution shaft 10 is disposed confronting the driving shaft 2 through 180 degrees via the driven shaft 3, the 180-degree confronting is not limitative. The load distribution shaft 10 may be disposed in a subsequently opposite region to the driving shaft 2 with respect to the driven shaft 3 (e.g. the state where the driven shaft 3 is partially disposed between the driving shaft 2 and the load distribution shaft 10). Note that the 180-degree confronting arrangement of the load distribution shaft 10 achieves a more effective load distribution.

Second Embodiment

The present invention is not intended to be limited to the configuration of the first embodiment and can be carried out in other various modes. For example, a cross-sectional view of a transmission gear system according to a second embodiment of the present invention is shown in FIG. 3.

Figure 3:
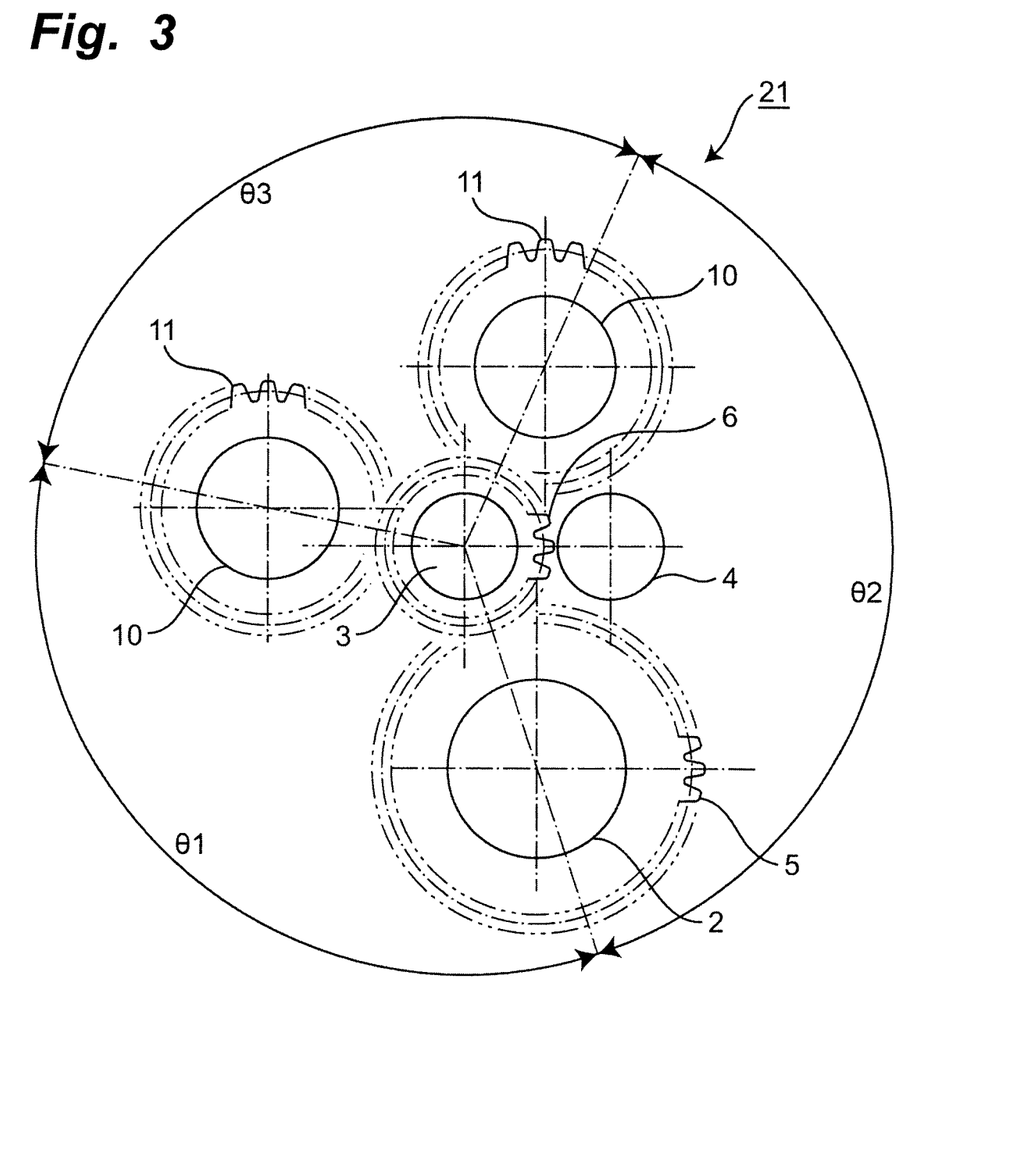
FIG. 3 is a cross-sectional view of a transmission gear system according to a second embodiment of the present invention.

As shown in FIG. 3, a transmission gear system 21 of the second embodiment differs in configuration from the transmission gear system of the first embodiment in that two load distribution shafts 10 are disposed for a single driving shaft 2 and a single driven shaft 3. In the transmission gear system 21 of FIG. 3, the same reference numerals are imparted to the same constituent members as those of the transmission gear system of the first embodiment, and explanations thereof will be omitted.

As shown in FIG. 3, the two load distribution shafts 10 are arranged in an opposite region to the driving shaft 2 with respect to a rotation center of the driven shaft 3. Specifically, the driving shaft 2 and the load distribution shafts 10 are arranged at equal angles θ1, θ2, and θ3 (120-degree intervals) around the driven shaft 3. The load distribution gears 11 engaged with the driven gear 6 are fixed to the two load distribution shafts 10, respectively.

According to such a configuration, a load generated radially of the driven shaft 3 can be distributed to and received by the driving shaft 2 and the two load distribution shafts 10, i.e. can be distributed and received in three directions. This enables a larger load to be effectively received.

Although description has been given, as an example, of the equiangular arrangement of the driving shaft 2 and the two load distribution shafts 10 around the driven shaft 3, the angular intervals θ1, θ2, and θ3 may be substantially equal angles and may be set within a range of 100 to 140 degrees for example.

Although the case has been described where the load is distributed in three directions, the load may be distributed in four or more directions.

Third Embodiment

Figure 4:
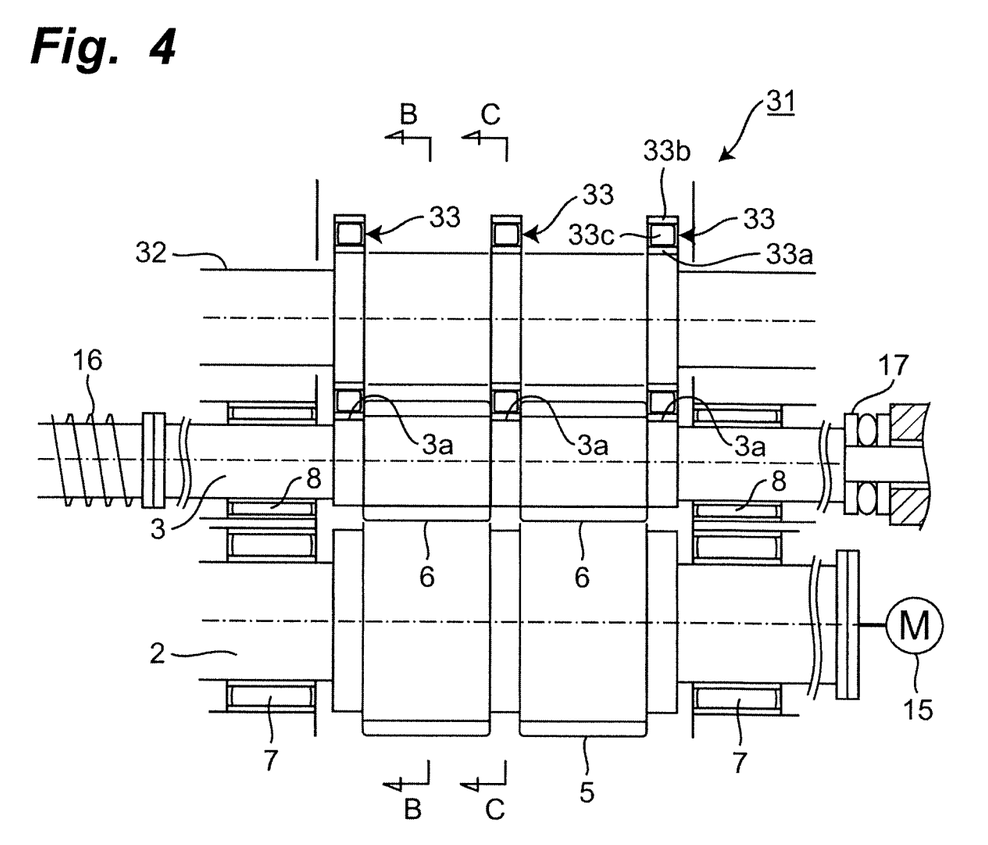
FIG. 4 is a configuration diagram of a transmission gear system according to a third embodiment of the present invention.

Next, a schematic configuration of a transmission gear system according to a third embodiment of the present invention is shown in FIG. 4. A cross-sectional view taken along line B-B of FIG. 4 is shown in FIG. 5, while a cross-sectional view taken along line C-C is shown in FIG. 6.

Although in the first and second embodiments the case has been described where the load distribution shafts are engaged via the gears with the driven gear, a transmission gear system of the third embodiment differs in configuration from the first and second embodiments in that, instead of the gear engagement, the outer rings of the bearing parts disposed on the load distribution shaft are brought into contact with the peripheral surface of the driven shaft so as to receive the load. In a transmission gear system 31 of FIGS. 4 to 6, the same reference numerals are imparted to the same constituent members as those of the transmission gear system of the first and second embodiments and explanations thereof will be omitted.

Figure 5:
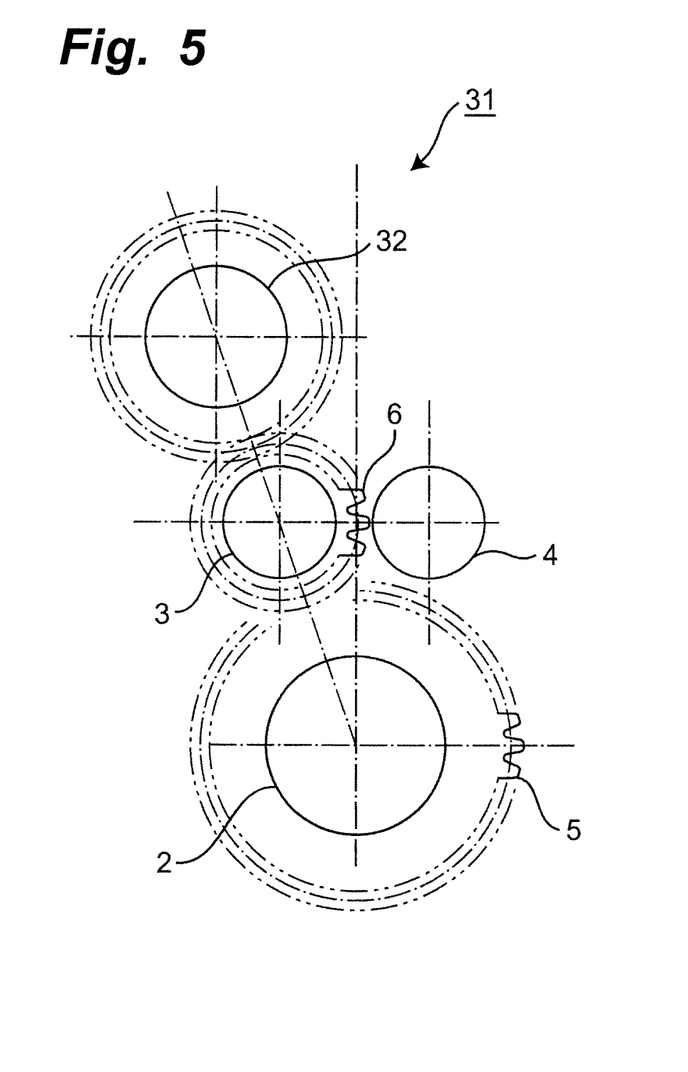
FIG. 5 is a cross-sectional view, taken along line B-B, of the transmission gear system of FIG. 4.
Figure 6:
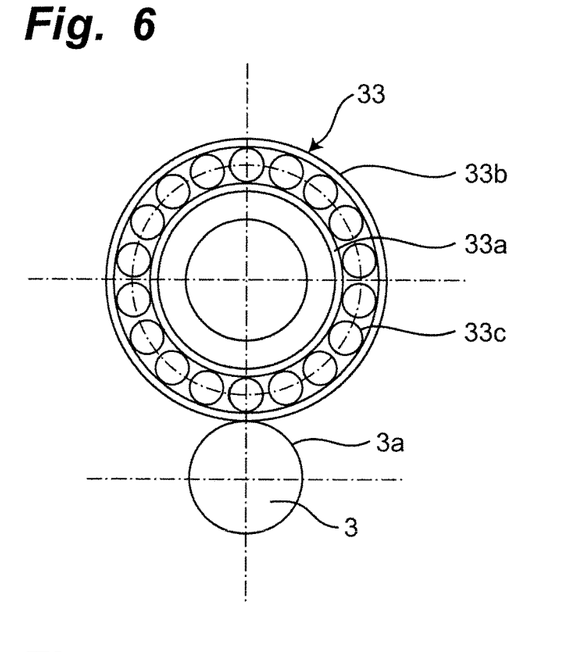
FIG. 6 is a cross-sectional view, taken along line C-C, of the transmission gear system of FIG. 4.

As shown in FIGS. 4 to 6, in the transmission gear system 31 of the third embodiment, a load distribution shaft 32 extends parallel to the driving shaft 2 and the driven shaft 3. The load distribution shaft 32 is supported by three bearing parts 33 for example. As shown in FIG. 6, the bearing part 33 includes an inner bearing ring 33a fixed to the outer peripheral surface of the load distribution shaft 32; an outer bearing ring 33b rotatable relative to the inner bearing ring 33a; and a bearing roller 33c interposed between the inner bearing ring 33a and the outer bearing ring 33b. That is, the outer bearing ring 33b is rotatable relative to the inner bearing ring 33a fixed to the load distribution shaft 32.

As shown in FIG. 6, the outer bearing ring 33b is disposed so as to be able to come into contact with the outer peripheral surface of the driven shaft 3. Specifically, the outer peripheral surface of a reception part 3a disposed on the outer periphery of the driven shaft 3 is allowed to come into contact with the outer bearing ring 33b.

According to such a configuration of the transmission gear system 31, a radial load applied on the driven shaft 3 can be distributed to and received by the bearing parts 33 of the load distribution shaft 32. By virtue of employment of the configuration where the reception part 3a disposed on the outer periphery of the driven shaft 3 comes into contact with the outer bearing ring 33b of the bearing part 33 on the load distribution shaft 32, smooth rotation of the driven shaft 3 is ensured.

As shown in FIG. 4, the driven gear 6 further has at its center in the axial direction the reception part 3a capable of coming into contact with the bearing part 33 of the load distribution shaft 32, whereby the load distribution shaft 32 can receive the load at three points in the axial direction so that the load distribution effect can be enhanced. Particularly, in such a configuration, the buckling load applied on the driven shaft 3 can effectively be received by the load distribution shaft 32.

Although in the description of the third embodiment the case has been described by way of example where the radial load of the driven shaft 3 is received at three points by the load distribution shaft 32, the number of points to receive the load may be at least one and a plurality of reception points can be set depending on the system configuration or the load level.

Fourth Embodiment

Figure 7:
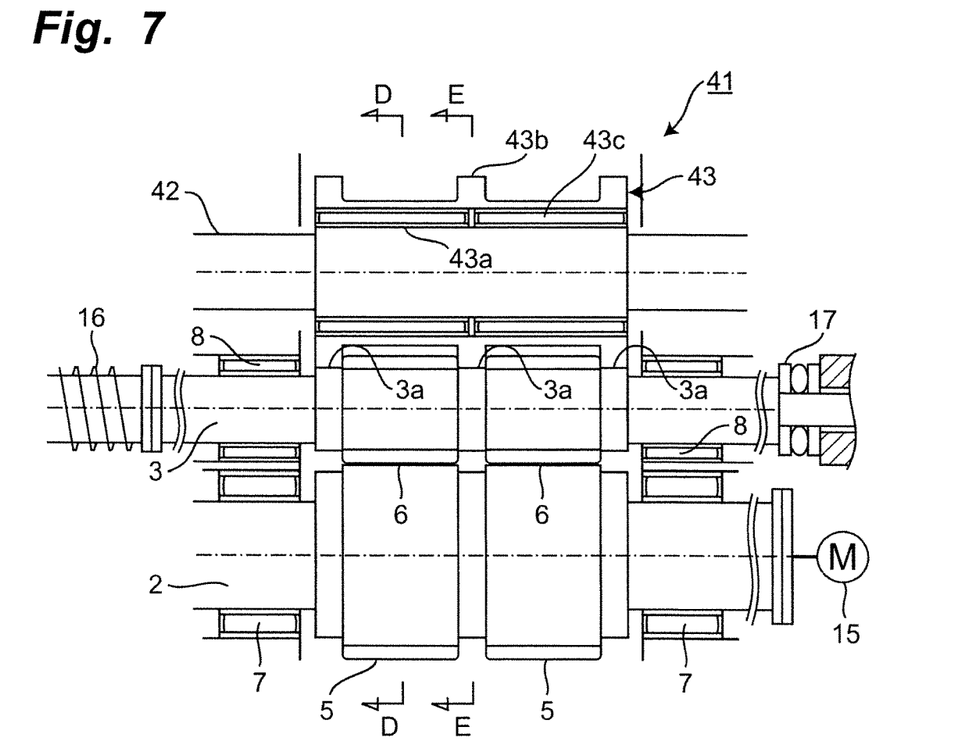
FIG. 7 is a configuration diagram of a transmission gear system according to a fourth embodiment of the present invention.

Next, a schematic configuration of a transmission gear system according to a fourth embodiment of the present invention is shown in FIG. 7. A cross-sectional view taken along line D-D of FIG. 7 is shown in FIG. 8, while a cross-sectional view taken along line E-E is shown in FIG. 9.

Figure 8:
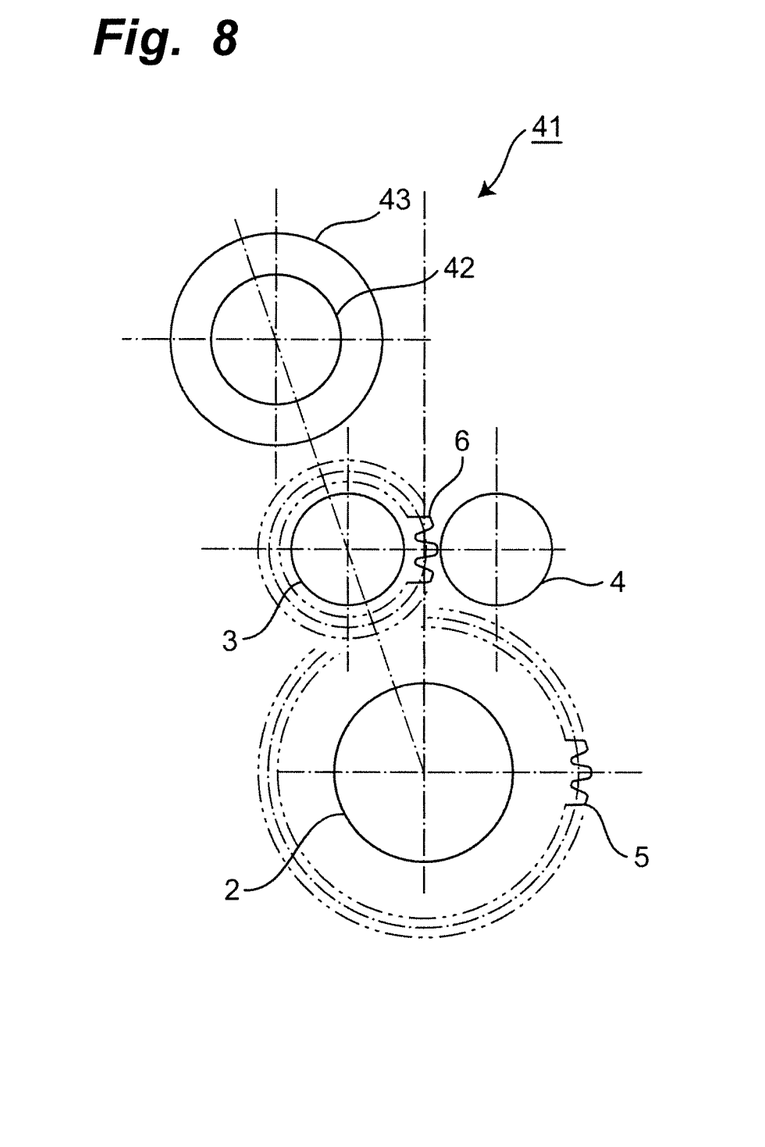
FIG. 8 is a cross-sectional view, taken along line D-D, of the transmission gear system of FIG. 7.
Figure 9:
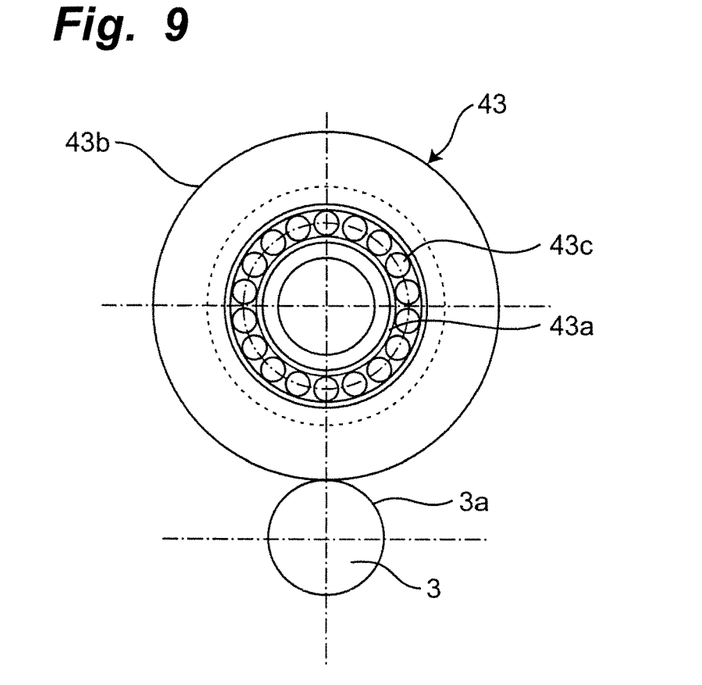
FIG. 9 is a cross-sectional view, taken along line E-E, of the transmission gear system of FIG. 7.

As shown in FIGS. 7 to 9, a transmission gear system 41 of the fourth embodiment differs in configuration from the third embodiment in that, instead of disposing a plurality of bearing parts on a load distribution shaft 42, a single bearing part 43 integrating the plurality of bearing parts is disposed thereon. In the transmission gear system 41 of FIGS. 7 to 9, the same reference numerals are imparted to the same constituent members as those of the transmission gear system of the first to third embodiments described above, and explanations thereof will be omitted.

Specifically, the single bearing part 43 is disposed on the load distribution shaft 42. The bearing part 43 includes an inner bearing ring 43a secured to the outer peripheral surface of the load distribution shaft 42; an outer bearing ring 43b rotatable relative to the inner bearing ring 43a; and a bearing roller 43c interposed between the inner bearing ring 43a and the outer bearing ring 43b. That is, the outer bearing ring 43b is rotatable relative to the inner bearing ring 43a fastened to the load distribution shaft 42.

The outer bearing ring 43b has three annular protrusions 43d along the axial direction of the load distribution shaft 42. The protrusions 43b can come into contact with three reception parts 3a, respectively, of the driven shaft 3.

According to such a configuration, the integrated outer bearing ring 43b enables a greater load to be received, as compared with the configuration of the third embodiment. Accordingly, the transmission gear system 41 can cope with a greater load and implement the power up of the extruder or kneader.

In the third and fourth embodiments, description has been given of the configuration where the radial load applied on the driven shaft is received by the load distribution shaft by allowing the outer bearing ring and the reception part of the driven shaft to come into contact with each other. In this configuration, the outer bearing ring and the reception part need not be in contact with each other at all times, and a gap may be disposed between the outer bearing ring and the reception part so that the outer bearing ring and the reception part can come into contact with each other when the driven shaft is radially deformed due to a load applied on the driven shaft.

Also in the configurations of the third and fourth embodiments, a plurality of load distribution shafts receiving a load of a single driven shaft may be disposed.

By appropriately combining any embodiments among the various embodiments, their respective effects can be presented.

EXPLANATIONS OF LETTERS OR NUMERALS 1 transmission gear system
2 driving shaft
3 driven shaft
3a reception part
4 driven shaft
5 driving gear
6 driven gear
7 bearing part
8 bearing part
10 load distribution shaft
11 load distribution gear
12 bearing part
33 bearing part
33a inner bearing ring
33b outer bearing ring
33c bearing roller

The invention claimed is:

1. A transmission gear system of a multi-screw extruder or kneader having a plurality of screw shafts, the system comprising:
a driving shaft to which a driving gear is fixed, rotationally driven by a driving device;
a driven shaft to which a driven gear is fixed, the driven gear being engaged with the driving gear and rotationally driven by the driving gear, the driven shaft being coupled to at least one screw shaft of the plurality of screw shafts so as to allow the one screw shaft to be rotationally driven; and
a load distribution shaft to which a load distribution gear engaged with the driven gear is fixed, the load distribution gear being another driven gear which is rotationally driven by the driven gear, the load distribution shaft being disposed in a region opposite to the driving shaft with respect to the driven shaft, wherein
a radial load generated on the driven shaft is transmitted via the driven gear and the load distribution gear to the load distribution shaft to distribute the load, and
the load distribution gear and the load distribution shaft are not configured for driving the screw shafts.

2. The transmission gear system of a multi-screw extruder or kneader of claim 1, wherein a plurality of load distribution shafts are arranged in a region opposite to the driving shaft with respect to the driven shaft.

3. The transmission gear system of a multi-screw extruder or kneader of claim 2, wherein two load distribution shafts are arranged in a region opposite to the driving shaft with respect to the driven shaft, and the two load distribution shafts and the driving shaft are arranged at substantially equal intervals around the driven shaft.

4. The transmission gear system of a multi-screw extruder or kneader of claim 1, wherein the load distribution shaft is disposed confronting the driving shaft via the driven shaft.

5. A transmission gear system of a multi-screw extruder or kneader having a plurality of screw shafts, the system comprising:
a driving shaft to which a driving gear is fixed, rotationally driven by a driving device;
a driven shaft to which a driven gear engaged with the driving gear is fixed, the driven shaft being coupled to at least one screw shaft of the plurality of screw shafts so as to allow the one screw shaft to be rotationally driven; and
a load distribution shaft disposed in a region opposite to the driving shaft with respect to the driven shaft, wherein
a load-receiving bearing is fixed to the load distribution shaft, an outer ring portion of the load-receiving bearing comes into contact with an outer periphery of the driven shaft so that a radial load generated on the driven shaft is transmitted via the bearing to the load distribution shaft to distribute the load.

6. The transmission gear system of a multi-screw extruder or kneader of claim 5, wherein one or more load-receiving bearings are fixed to the load distribution shaft so as to come into contact with both end portions of the driven gear on the driven shaft.

7. The transmission gear system of a multi-screw extruder or kneader of claim 6, wherein outer ring portions of the load-receiving bearings are formed integrally with each other.

8. The transmission gear system of a multi-screw extruder or kneader of claim 5, wherein a plurality of load distribution shafts are arranged in a region opposite to the driving shaft with respect to the driven shaft.

9. The transmission gear system of a multi-screw extruder or kneader of claim 8, wherein two load distribution shafts are arranged in a region opposite to the driving shaft with respect to the driven shaft, and the two load distribution shafts and the driving shaft are arranged at substantially equal intervals around the driven shaft.

10. The transmission gear system of a multi-screw extruder or kneader of claim 5, wherein the load distribution shaft is disposed confronting the driving shaft via the driven shaft.

* * * * *